US009832768B2

(12) United States Patent
Takahashi et al.

(10) Patent No.: US 9,832,768 B2
(45) Date of Patent: Nov. 28, 2017

(54) MOBILE COMMUNICATION METHOD AND RADIO BASE STATION

(75) Inventors: Hideaki Takahashi, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 13/805,743

(22) PCT Filed: Jun. 20, 2011

(86) PCT No.: PCT/JP2011/064076
§ 371 (c)(1),
(2), (4) Date: Mar. 12, 2013

(87) PCT Pub. No.: WO2011/162211
PCT Pub. Date: Dec. 29, 2011

(65) Prior Publication Data
US 2013/0176936 A1  Jul. 11, 2013

(30) Foreign Application Priority Data

Jun. 21, 2010  (JP) ................. 2010-141108

(51) Int. Cl.
*H04W 72/04* (2009.01)
*H04W 36/10* (2009.01)
(Continued)

(52) U.S. Cl.
CPC .... *H04W 72/0446* (2013.01); *H04B 7/15507* (2013.01); *H04W 36/10* (2013.01);
(Continued)

(58) Field of Classification Search
USPC .... 370/354, 310, 310.2, 348, 468, 492, 496, 370/501, 278, 280, 281, 315–319, (Continued)

(56) References Cited

U.S. PATENT DOCUMENTS 5,953,326 A *  9/1999  Nakamura et al. ........... 370/335
6,563,807 B1 *  5/2003  Kim et al. .................... 370/331
(Continued)

FOREIGN PATENT DOCUMENTS

| CN | WO 2010057521 A1 * | 5/2010 | ......... H04B 7/15557 |
| WO | WO 2010026287 A1 * | 3/2010 | |
| WO | WO 2011147045 A1 * | 12/2011 | |

OTHER PUBLICATIONS

NTT DOCOMO, Inc., Consideration on Un link configuration, 3GPP TSG-RAN WG2 #69 R2-101542, Feb. 22, 2010, whole document.*

(Continued)

Primary Examiner — Hanh N Nguyen
Assistant Examiner — Jose L Perez
(74) Attorney, Agent, or Firm — Osha Liang LLP

(57) ABSTRACT

A mobile communication method according to the present invention includes a step of transmitting, by a radio base station DeNB, a first downlink signal in a first subframe to a relay node RN, a step of transmitting, by the relay node RN, a second downlink signal in a second subframe to a mobile station UE, a step of notifying, by the relay node RN, the radio base station DeNB of information indicating "Half duplex inband Relay Node", and a step of transmitting, by the radio base station DeNB, a transmission timing of R-PDCCH and R-PDSCH in a Un subframe to the relay node RN according to the notification.

6 Claims, 5 Drawing Sheets

(51) Int. Cl.

| | | |
|---|---|---|
| *H04B 7/155* | (2006.01) | |
| *H04W 72/12* | (2009.01) | |
| *H04W 84/04* | (2009.01) | |
| *H04W 16/26* | (2009.01) | |
| *H04W 88/04* | (2009.01) | |
| *H04W 56/00* | (2009.01) | |
| *H04L 5/00* | (2006.01) | |
| *H04L 5/16* | (2006.01) | |

(52) U.S. Cl.
CPC ....... *H04W 72/1289* (2013.01); *H04L 5/0062* (2013.01); *H04L 5/16* (2013.01); *H04W 16/26* (2013.01); *H04W 56/00* (2013.01); *H04W 84/045* (2013.01); *H04W 84/047* (2013.01); *H04W 88/04* (2013.01)

(58) Field of Classification Search
USPC ..... 370/328–338, 350, 254; 455/63.1, 114.2; 375/346
See application file for complete search history.

(56) References Cited

U.S. PATENT DOCUMENTS

| | | | |
|---|---|---|---|
| 2010/0080139 A1* | 4/2010 | Palanki et al. ................ | 370/252 |
| 2010/0111018 A1* | 5/2010 | Chang ........................... | 370/329 |
| 2010/0238845 A1* | 9/2010 | Love et al. .................... | 370/280 |
| 2011/0044261 A1* | 2/2011 | Cai et al. ....................... | 370/329 |
| 2011/0051654 A1* | 3/2011 | Blankenship ........ | H04B 7/2606 370/315 |
| 2011/0103291 A1* | 5/2011 | Wiberg et al. ................ | 370/315 |
| 2012/0063382 A1* | 3/2012 | Seki .............................. | 370/312 |
| 2012/0076101 A1* | 3/2012 | Kojima ......................... | 370/329 |
| 2012/0275352 A1* | 11/2012 | Diao et al. .................... | 370/280 |

OTHER PUBLICATIONS

Alcatel-Lucent Shanghai Bell, Alcatel-Lucent, Backhaul Link Control Channel Design for Type I Relay, 3GPP TSG RAN WGI #58Bis R1-093789, Oct. 16, 2009, whole document.*
NTT DOCOMO, Inc. (Issues on Un and Uu link configuration during RN start up, 3GPP TSG-RAN WG2 #68bis R2-100256), Jan. 18-22, 2010, whole document.*
Alcatel-Lucent Shanghai Bell, Alcatel-Lucent (Backhaul Link Control Channel Design for Type I Relay, 3GPP TSG RAN WGI #58Bis R1-093789), Oct. 16, 2009, whole document.*
NTT DOCOMO, Inc. (Consideration on Un link configuration, 3GPP TSG-RAN WG2 #69 R2-101542), Feb. 22, 2010, whole document.*
NTT DOCOMO, Inc., (R2-100256), Issues on Un and Uu link configuration during RN start up, Jan. 18-22, 2010, 3GPP TSG-RAN WG2 #68bis, whole document.*
ETSI TS 136 331 V9.2.0 (Apr. 2010), LTE; Evolved Universal Terrestrial Radio Access (E-UTRA); Radio Resource Control (RRC); Protocol specification (3GPP TS 36.331 version 9.2.0 Release 9), Apr. 2010, pp. 13, 20, 143-144, 154-155.*
NTT DOCOMO, Inc., (R2-101542), Consideration on Un link configuration, Feb. 22-26, 2010, 3GPP TSG-RAN WG2 #69, whole document.*
Alcatel-Lucent, (R1-093789), Backhaul Link Control Channel Design for Type I Relay, Oct. 12-16, 2009, 3GPP TSG RAN WGI #58Bis, whole document.*
Alcatel-Lucent Shanghai Bell, Alcatel-Lucent (R1-093789), Backhaul Link Control Channel Design for Type I Relay), Oct. 12-16, 2009, 3GPP TSG RAN WGI #58Bis, whole document.*
Institute for Information Industry (III), Coiler Corporation, (R2-103214, RRC enhancements for the Un subframe (re)configuration), May 10-14, 2010, 3GPP TSG-RAN WG2 #70, whole document.*
International Search Report issued in PCT/JP2011/064076 dated Jul. 19, 2011 (4 pages).

Written Opinion of the International Searching Authority issued in PCT/JP2011/064076 dated Jul. 19, 2011 (4 pages).
NTT DOCOMO, Inc.; "Consideration on Un link configuration"; 3GPP TSG-RAN WG2 #69, R2-101542; San Francisco, USA; Feb. 22-26, 2010 (4 pages).
NTT DOCOMO, Inc.; "Issues on Un link configuration during RN start up"; 3GPP TSG-RAN WG2 #68bis, R2-100256; Valencia, Spain; Jan. 18-22, 2010 (3 pages).
3GPP TR 36.814 V9.0.0; "3rd Generation Partnership Project; Technical Specification Group Radio Access Network; Evolved Universal Terrestrial Radio Access (E-UTRA); Further advancements for E-UTRA physical layer aspects (Release 9)"; Mar. 2010 (4pages).
Alcatel-Lucent Shanghai Bell, Alcatel-Lucent; "Backhaul Link Control Channel Design for Type I Relay"; 3GPP TSG RAN WG1 #58Bis, R1-093789; Miyazaki. Japan; Oct. 12-16, 2009 (3 pages).
Panasonic; "UL/DL HARQ timing for Un Interface"; 3GPP TSG-RAN WG1 Meeting #60, R1-101272; San Francisco, USA; Feb. 22-26, 2010 (4 pages).
AT&T et al.; "Updated WF on addressing forward compatibility in Rel-8"; 3GPP TSG-RAN WG1 #55, R1-084686; Prague, Czech Republic; Nov. 10-14, 2008 (1 page).
Japanese Office Action for corresponding Japanese Application No. 2010-141108 dated Jul. 12, 2011 (6 pages).
Japanese Office Action for corresponding Japanese Application No. 2010-141108 dated Jan. 17, 2012 (8 pages).
3GPP TS 36.300 V10.0.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage2 (Release 10)"; Jun. 2010 (183 pages).
3GPP TR 36.814 V9.0.0; "3rd Generation Partnership Project; Technical Specification Group Radio Access Network; Evolved Universal Terrestrial Radio Access (E-UTRA); Further advancements for E-UTRA physical layer aspects (Release 9)"; Mar. 2010 (105 pages).
3GPP TS 36.331 V9.3.0; "3rd Generation Partnership Project; Technical Specification Group Radio Access Network; Evolved Universal Terrestrial Radio Access (E-UTRA); Radio Resource Control (RRC); Protocol specification (Release 9)"; Jun. 2010 (250 pages).
3GPP TS 36.300 V10.3.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)"; Mar. 2011 (197 pages).
3GPP TS 36.331 V10.1.0; "3rd Generation Partnership Project; Technical Specification Group Radio Access Network; Evolved Universal Terrestrial Radio Access (E-UTRA); Radio Resource Control (RRC); Protocol specification (Release 10)"; Mar. 2011 (290 pages).
International Preliminary Report on Patentability from PCT/JP2011/064076 dated Jan. 15, 2013 (6 pages).
Office Action in corresponding Chinese application No. 201180030786.6 dated Jul. 24, 2013 (15 pages).
Office Action issued in counterpart Russian Patent Application No. 2012157385/07(090424) dated Jun. 26, 2014 (8 pages).
Office Action issued in counterpart Chinese Patent Application No. 201180030786.6 dated Sep. 1, 2014 (18 pages).
Office Action issued in counterpart European Patent Application No. 11 798 095.3 dated Sep. 30, 2014 (6 pages).
Extended European Search Report issued in European Application No. 11798095.3, dated Feb. 3, 2014 (8 pages).
Alcatel-Lucent; "Un re-configuration for Type-1 relays"; 3GPP TSG-RAN WG2 Meeting #70, R2-102874; Montreal, Canada; May 10-14, 2010 (4 pages).
Nokia Siemens Networks, Nokia Corporation; "Un Subframe Configuration/Reconfiguration for In-band Relay"; 3GPP TSG-RAN WG2 Meeting #70, R2-103068; Montreal, Canada; May 10-14, 2010 (4 pages).
NTT DOCOMO, Inc.; "Consideration on relay node capability"; 3GPP TSG-RAN WG2 #69, R2-101540; San Francisco, USA; Feb. 22-26, 2010 (3 pages).

(56) References Cited

OTHER PUBLICATIONS

Office Action issued in Chinese Application No. 201180030786.6, dated Feb. 7, 2014 (17 pages).
Office Action issued in counterpart European Patent Application No. 11 798 095.3 dated May 8, 2015 (6 pages).
Office Action in corresponding Chinese application No. 201180030786.6 dated Dec. 3, 2015 (16 pages).
Office Action issued in counterpart Chinese Patent Application No. 201180030786.6 dated Mar. 4, 2014 (22 pages).
Office Action issued in counterpart Indonesian Patent Application No. W-00 2013 00184 dated Feb. 16, 2016 (4 pages).
Office Action in counterpart Chinese Patent application No. 201180030786.6, dated Jun. 14, 2016 (19 pages).
Office Action issued in the counterpart Chinese Patent Application No. 201180030786.6, dated Sep. 26, 2016 (36 pages).

* cited by examiner

FIG. 5

UE-EUTRA-Capability information element

```
-- ASN1START

UE-EUTRA-Capability ::=        SEQUENCE {
    accessStratumRelease           AccessStratumRelease,
    ue-Category                    INTEGER(1..5),
    pdcp-Parameters                PDCP-Parameters,
    phyLayerParameters             PhyLayerParameters,
    rf-Parameters                  RF-Parameters,
    measParameters                 MeasParameters,
    ...
    },
    nonCriticalExtension           UE-EUTRA-Capability-v920-IEs    OPTIONAL
}
UE-EUTRA-Capability-v920-IEs ::=   SEQUENCE {
    phyLayerParameters-v920        PhyLayerParameters-v920,
    ...
    nonCriticalExtension           UE-EUTRA-Capability-va00-IEs
                                   OPTIONAL
)
UE-EUTRA-Capability-va00-IEs ::=   SEQUENCE {
    Relay-Parameters-va00          Relay-Parameters-va00,
    nonCriticalExtension           SEQUENCE {}          OPTIONAL
}
...
}
Relay-Parameters-va00 ::=          SEQUENCE {
    RelayNodeType-r9               ENUMERATED{halfDuplexInband, fullDuplexInband, Outband,...}
}
-- ASN1STOP
```

| UE-EUTRA-Capability field descriptions |
|---|
| *accessStratumRelease* |
| set to rel9 in this version of the specification. |
| ... |
| *Relay-ResourcePartitionNeed* |
| Indicates whether the resource partitioning between the Un and RN-Uu is needed. |

MOBILE COMMUNICATION METHOD AND RADIO BASE STATION

TECHNICAL FIELD

The present invention relates to a mobile communication method and a radio base station.

BACKGROUND ART

In a mobile communication system employing an LTE (Long Term Evolution)-Advanced scheme which is the next generation of an LTE scheme, a "relay node RN" having the same function as that of a radio base station DeNB (Donor eNB) may be connected between a mobile station UE and the radio base station DeNB.

In the LTE-Advanced mobile communication system, a Uu subframe is configured to be set between the mobile station UE and the relay node RN, and a Un subframe is configured to be set between the relay node RN and the radio base station DeNB.

CITATION LIST

Non Patent Literature

[NPL 1] 3GPP TS 36.300 (V10.0.0), "Evolved Universal Terrestrial Radio Access (E-UTRA) and Evolved Universal Terrestrial Radio Access Network (E-UTRAN) Physical Channels", June, 2010

[NPL 2] 3GPP TR 36.814 (V9.0.0), "Further Advancements for E-UTRA Physical Layer Aspects", March, 2010

[NPL 3] 3GPP TS 36.331 (V9.3.0), "Radio Resource Control (RRC); Protocol specification", June, 2010

[NPL 4] 3GPP R1-084686, "Updated WF on addressing forward compatibility in Rel-8", November, 2008

However, the mobile communication system has the following problem: when a reception process (a reception process in the Un subframe), by the relay node RN, of a downlink signal from the radio base station DeNB and a transmission process (a transmission process in the Uu subframe), by the relay node RN, of a downlink signal to the mobile station UE are simultaneously performed, or when a reception process (a reception process in the Uu subframe), by the relay node RN, of an uplink signal from the mobile station UE and a transmission process (a transmission process in the Un subframe), by the relay node RN, of an uplink signal to the radio base station DeNB are simultaneously performed, a transmitted signal of the relay node RN may return to its own reception circuit, resulting in the occurrence of interference.

Therefore, the present invention has been achieved in view of the above-described problems, and an object thereof is to provide a mobile communication method and a radio base station, with which it is possible to reduce interference to a reception circuit of a relay node, which occurs when a transmission/reception process in a Un subframe and a transmission/reception process in a Uu subframe are simultaneously performed.

A first characteristic of the present invention is summarized in that a mobile communication method includes: a step of transmitting, by a radio base station, a first downlink signal in a first subframe to a relay node; a step of transmitting, by the relay node, a second downlink signal in a second subframe to a mobile station; a step of notifying, by the relay node, that the first subframe and the second subframe should be prevented from overlapping each other in a time direction, to the radio base station; and a step of transmitting, by the radio base station, a transmission timing of a physical downlink control channel and a physical downlink shared channel addressed to the relay node in a subframe between the relay node and the radio base station to the relay node according to the notification.

A second characteristic of the present invention is summarized in that a mobile communication method includes: a step of transmitting, by a radio base station, a first downlink signal in a first subframe to a relay node; a step of transmitting, by the relay node, a second downlink signal in a second subframe to a mobile station; a step of notifying, by the relay node, that the first subframe and the second subframe should be prevented from overlapping each other in a time direction, to the radio base station; and a step of transmitting, by the radio base station, the number of OFDM symbols receivable in one subframe between the relay node and the radio base station to the relay node according to the notification.

A third characteristic of the present invention is summarized in that a mobile communication method includes: a step of transmitting, by a radio base station, a first downlink signal in a first subframe to a relay node; a step of transmitting, by the relay node, a second downlink signal in a second subframe to a mobile station; a step of notifying, by the relay node, that the first subframe and the second subframe should be prevented from overlapping each other in a time direction, to the radio base station; and a step of transmitting, by the radio base station, an arrangement pattern of a reference signal for demodulation addressed to the relay node in a subframe between the relay node and the radio base station to the relay node according to the notification.

A fourth characteristic of the present invention is summarized in that a radio base station, which is used in a mobile communication system in which a relay node is configured to transmit a second downlink signal in a second subframe to a mobile station, includes: a transmission unit configured to transmit a first downlink signal in a first subframe to the relay node, wherein, when a notification indicating that the first subframe and the second subframe should be prevented from overlapping each other in a time direction, is received from the relay node, the transmission unit is configured to transmit a transmission timing of a physical downlink control channel and a physical downlink shared channel addressed to the relay node in a subframe between the relay node and the radio base station to the relay node.

A fifth characteristic of the present invention is summarized in that a radio base station, which is used in a mobile communication system in which a relay node is configured to transmit a second downlink signal in a second subframe to a mobile station, includes: a transmission unit configured to transmit a first downlink signal in a first subframe to the relay node, wherein, when a notification indicating that the first subframe and the second subframe should be prevented from overlapping each other in a time direction, is received from the relay node, the transmission unit is configured to transmit the number of OFDM symbols receivable in one subframe between the relay node and the radio base station to the relay node.

A sixth characteristic of the present invention is summarized in that a radio base station, which is used in a mobile communication system in which a relay node is configured to transmit a second downlink signal in a second subframe to a mobile station, includes: a transmission unit configured to transmit a first downlink signal in a first subframe to the relay node, wherein, when a notification indicating that the first subframe and the second subframe should be prevented from overlapping each other in a time direction, is received from the relay node, the transmission unit is configured to transmit an arrangement pattern of a reference signal for demodulation addressed to the relay node in a subframe between the relay node and the radio base station to the relay node.

As described above, according to the present invention, it is possible to provide a mobile communication method and a radio base station, by which it is possible to reduce interference to a reception circuit of a relay node, which occurs when a transmission/reception process in a Un subframe and a transmission/reception process in a Uu subframe are simultaneously performed.

BRIEF DESCRIPTION OF DRAWINGS

FIG. 5 is a diagram illustrating an example of a format of an information element "UE-EUTRA-Capability" in "RRC UE Capability Information" used in the mobile communication system according to the first embodiment of the present invention.

DESCRIPTION OF EMBODIMENTS (Mobile Communication System According to First Embodiment of the Present Invention)

A mobile communication system according to a first embodiment of the present invention is described with reference to FIG. 1 through FIG. 5.

Figure 1:
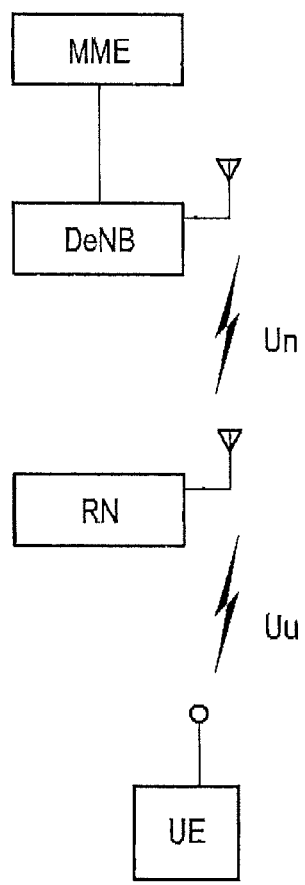
FIG. 1 is a diagram illustrating the entire configuration of a mobile communication system according to a first embodiment of the present invention.

As illustrated in FIG. 1, the mobile communication system according to the present embodiment is an LTE-Advanced mobile communication system, and includes a mobile management node MME (Mobility Management Entity), a radio base station DeNB, a relay node RN and the like.

Furthermore, in the example of FIG. 1, a Uu subframe (a Uu radio bearer) is set between the relay node RN and a mobile station UE, and a Un subframe (a Un radio bearer) is set between the radio base station DeNB and the relay node RN.

Figure 2:
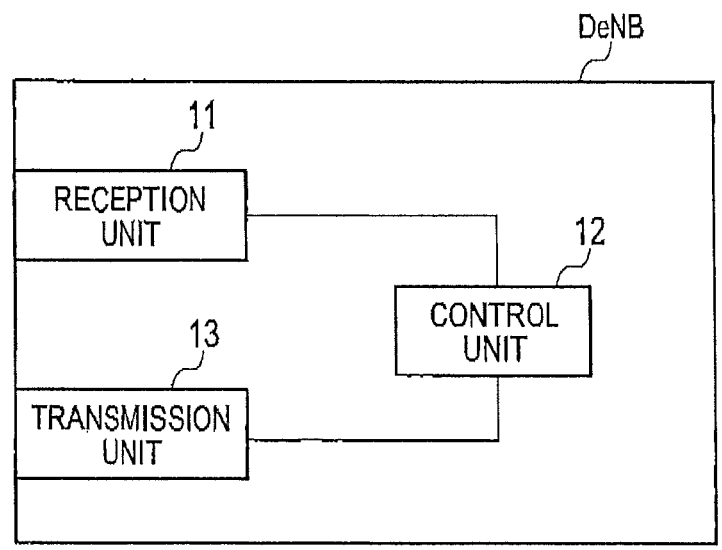
FIG. 2 is a functional block diagram of a radio base station according to the first embodiment of the present invention.

As illustrated in FIG. 2, the radio base station DeNB includes a reception unit 11, a control unit 12, and a transmission unit 13.

The reception unit 11 is configured to receive a signal transmitted by the relay node RN.

For example, the reception unit 11 is configured to receive a notification indicating either one of "Half duplex inband Relay Node (Type 1 relay)", "Full duplex inband Relay Node (Type 1b relay)", or "Outband Relay Node (Type 1a relay)", from the relay node RN through "RRC UE Capability Information" (for example, refer to 3GPP TR36.814).

When the notification indicating the "Half duplex inband Relay Node" is received in the reception unit 11, the control unit 12 is configured to determine a transmission timing (for example, a transmission start symbol) of R-PDCCH (Relay-Physical Downlink Control Channel) and R-PDSCH (Relay-Physical Downlink Shared Channel) in the Un subframe, the number of OFDM symbols receivable in one Un subframe, an arrangement pattern of DM-RS (Demodulation Reference Signal) addressed to the relay node RN in the Un subframe, and the like.

The transmission unit 13 is configured to transmit a signal to the relay node RN. Specifically, the transmission unit 13 is configured to transmit a first downlink signal in a first subframe scheduled in the Un subframe.

Furthermore, the transmission unit 13 is configured to transmit the transmission timing of the R-PDCCH and the R-PDSCH in the Un subframe, the number of OFDM symbols receivable in one Un subframe, the arrangement pattern of the DM-RS addressed to the relay node RN in the Un subframe, and the like, which have been determined by the control unit 12, to the relay node RN through "RRC Connection Reconfiguration".

Figure 3:
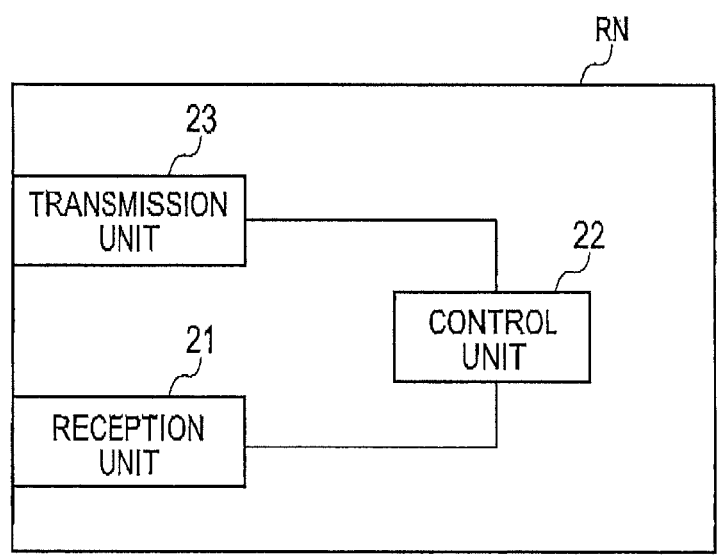
FIG. 3 is a functional block diagram of a relay node according to the first embodiment of the present invention.

As illustrated in FIG. 3, the relay node RN includes a reception unit 21, a control unit 22, and a transmission unit 23.

The reception unit 21 is configured to receive a signal transmitted by the radio base station DeNB and the mobile station UE.

For example, the reception unit 21 is configured to receive the transmission timing of the R-PDCCH and the R-PDSCH in the Un subframe, the number of OFDM symbols receivable in one Un subframe, the arrangement pattern of the DM-RS addressed to the relay node RN in the Un subframe, and the like through the "RRC Connection Reconfiguration".

The control unit 22 is configured to control communication in the relay node RN based on the transmission timing of the R-PDCCH and the R-PDSCH in the Un subframe, the number of OFDM symbols receivable in one Un subframe, the arrangement pattern of the DM-RS addressed to the relay node RN in the Un subframe, and the like, which were received in the reception unit 21.

The transmission unit 23 is configured to transmit a signal to the radio base station DeNB or the mobile station UE. Specifically, the transmission unit 23 is configured to transmit a second downlink signal in a second subframe scheduled in the Uu subframe.

For example, the transmission unit 23 is configured to transmit the notification indicating either one of "Half duplex inband Relay Node (Type 1 relay)", "Full duplex inband Relay Node (Type 1b relay)", or "Outband Relay Node (Type 1a relay)" to the radio base station DeNB through the "RRC UE Capability Information" (for example, refer to 3GPP TR36.814).

Hereinafter, with reference to FIG. 4 and FIG. 5, a description will be provided for an operation of the mobile communication system according to the present embodiment when an RRC connection is set between the radio base station DeNB and the relay node RN.

Figure 4:
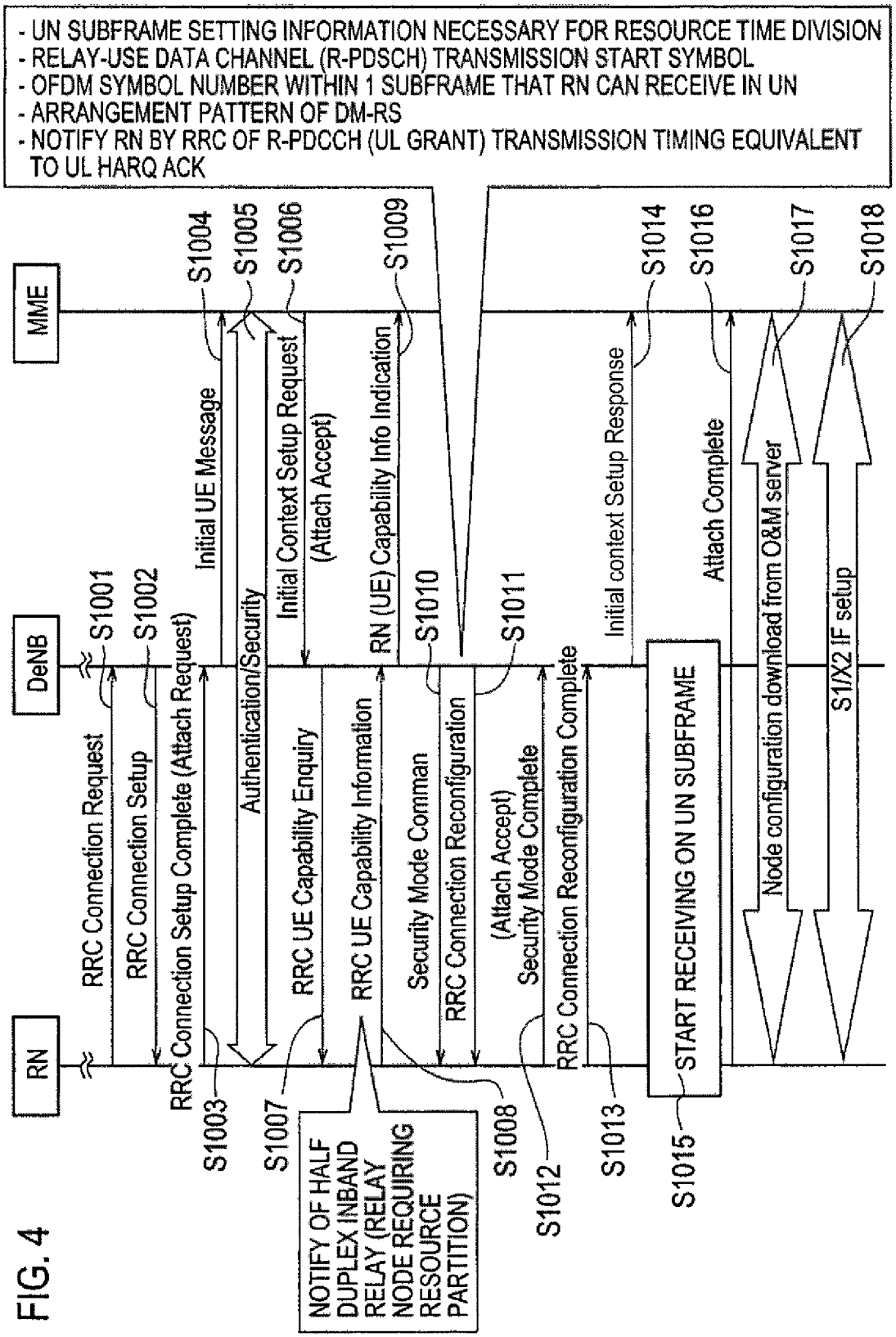
FIG. 4 is a sequence diagram illustrating operations in the mobile communication system according to the first embodiment of the present invention.

As illustrated in FIG. 4, in step S1001, the relay node RN transmits "RRC Connection Request" to the radio base station DeNB at the time of starting.

In step S1002, when a flag indicating the relay node RN was set in the "RRC Connection Request", the radio base station DeNB determines that the "RRC Connection Request" was transmitted from the relay node RN, and transmits "RRC Connection Setup" to the relay node RN.

In step S1003, the relay node RN transmits "RRC Connection Setup Complete" including "Attach Request" to the radio base station DeNB.

In step S1004, the radio base station DeNB transmits "Initial UE Message" including the "Attach Request" to the mobile management node MME.

After an "Authentication/Security process" is completed between the relay node RN and the mobile management node MME in step S1005, the mobile management node MME transmits "Initial Context Setup Request" including "Attach Accept" to the radio base station DeNB in step S1006.

When the mobile management node MME is notified of information, which indicates that a node having transmitted the "Attach Request" is the relay node RN, from a subscriber information management node HSS (Home Subscriber Server), the mobile management node MME transmits "Initial Context Setup Request" including information for identifying the relay node RN.

In step S1007, the radio base station DeNB transmits "RRC UE Capability Enquiry" to the relay node RN.

In step S1008, the relay node RN transmits "RRC UE Capability Information" to the radio base station DeNB.

For example, as illustrated in FIG. 5, the relay node RN transmits the notification indicating the "Half duplex inband Relay Node" to the radio base station DeNB through an information element "UE-EUTRA-Capability" in the "RRC UE Capability Information".

In step S1009, the radio base station DeNB transmits "RN(UE) Capability Info Indication" to the mobile management node MME.

The radio base station DeNB transmits "Security Mode Command" to the relay node RN in step S1010, and transmits "RRC Connection Reconfiguration" including the "Attach Accept" to the relay node RN in step S1011.

Furthermore, it is possible for the radio base station DeNB to transmit setting information of the Un subframe, the transmission timing of the R-PDCCH and the R-PDSCH in the Un subframe, the number of OFDM symbols receivable in one Un subframe, the arrangement pattern of the DM-RS addressed to the relay node RN in the Un subframe, and the like to the relay node RN through the "RRC Connection Reconfiguration".

The relay node RN transmits "Security Mode Complete" to the radio base station DeNB in step S1012, and transmits "RRC Connection Reconfiguration Complete" to the radio base station DeNB in step S1013.

In step S1014, the radio base station DeNB transmits "Initial Context Setup Response" to the mobile management node MME.

In step S1015, the relay node RN starts a reception process of a downlink signal on the Un subframe.

In step S1016, the relay node RN transmits "Attach Complete" to the mobile management node MME.

The relay node RN downloads "Node Configuration" from an O&M (Operation & Maintenance) server through the mobile management node MME in step S1017, and S1/X2 interfaces are established between the relay node RN and the mobile management node MME in step S1018.

In accordance with the mobile communication system according to the present embodiment, it is possible for the relay node RN to control communication in the relay node RN, based on the transmission timing of the R-PDCCH and the R-PDSCH in the Un subframe, the number of OFDM symbols receivable in one Un subframe, the arrangement pattern of the DM-RS addressed to the relay node RN in the Un subframe, and the like, which were received from the radio base station DeNB, so that it is possible to suitably reduce interference to the reception circuit of the relay node which occurs when the transmission/reception process in the Un subframe and the transmission/reception process in the Uu subframe are simultaneously performed.

(Mobile Communication System According to Second Embodiment of the Present Invention)

Figure 6:
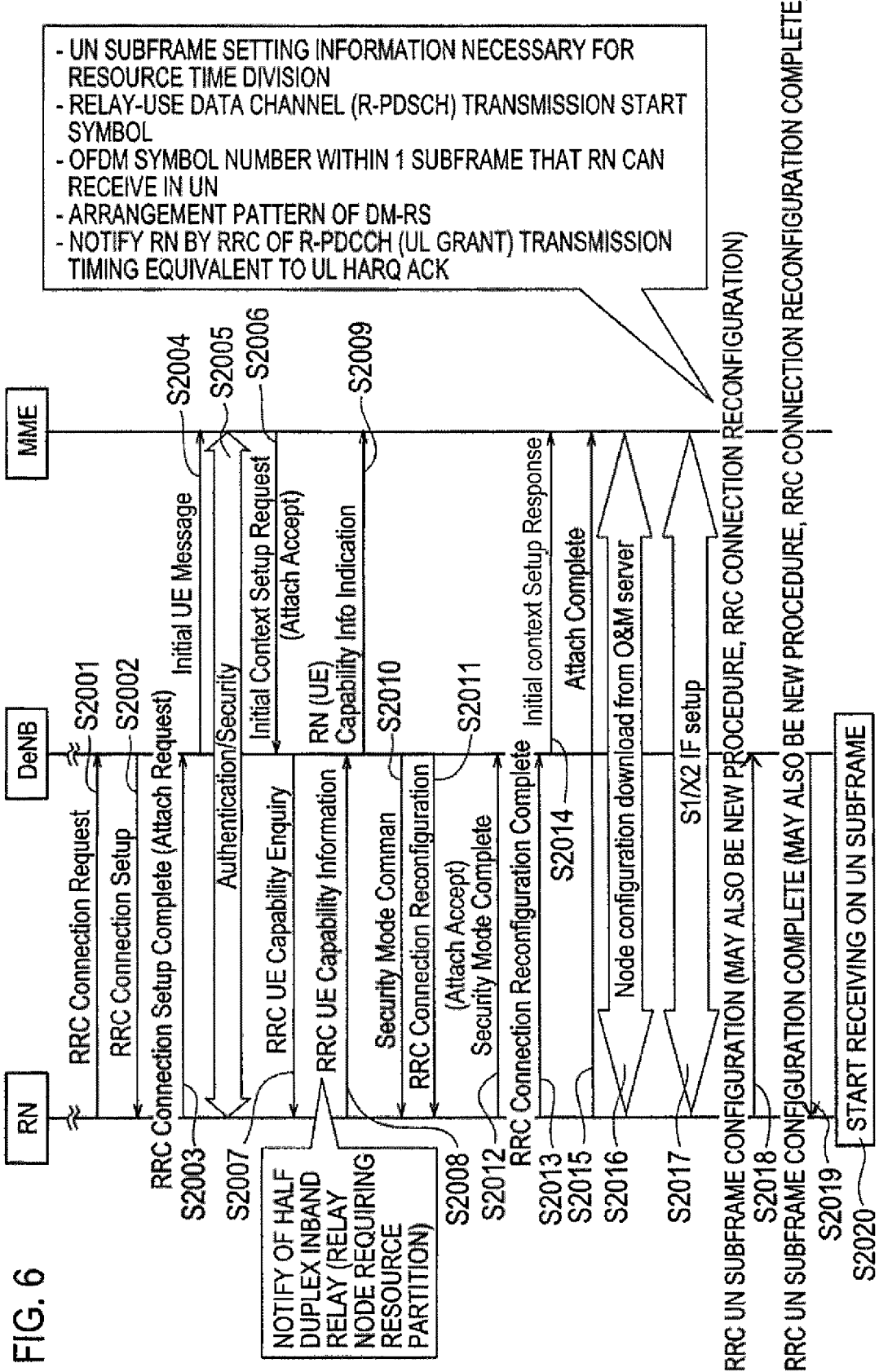
FIG. 6 is a sequence diagram illustrating an operation of the mobile communication system according to the second embodiment of the present invention.

With reference to FIG. 6, a mobile communication system according to a second embodiment of the present invention will be described while focusing on the difference from the mobile communication system according to the above-mentioned first embodiment.

Hereinafter, with reference to FIG. 6, a description will be provided for an operation of the mobile communication system according to the present embodiment when an RRC connection is set between the radio base station DeNB and the relay node RN.

As illustrated in FIG. 6, operations in step S2001 to S2014 are equal to the operations in step S1001 to S1014 illustrated in FIG. 4.

In step S2011, the radio base station DeNB transmits "RRC Connection Reconfiguration" including "Attach Accept".

Furthermore, differently from the mobile communication system according to the above-mentioned first embodiment, the radio base station DeNB does not transmit the setting information of the Un subframe, the transmission timing of the R-PDCCH and the R-PDSCH in the Un subframe, the number of OFDM symbols receivable in one Un subframe, the arrangement pattern of the DM-RS addressed to the relay node RN in the Un subframe, and the like to the relay node RN through the "RRC Connection Reconfiguration".

The relay node RN transmits the "Security Mode Complete" to the radio base station DeNB in step S2012, and transmits the "RRC Connection Reconfiguration Complete" to the radio base station DeNB in step S2013.

In step S2014, the radio base station DeNB transmits "Initial Context Setup Response" to the mobile management node MME.

In step S2015, the relay node RN transmits the "Attach Complete" to the mobile management node MME.

The relay node RN downloads "Node Configuration" from an O&M server through the mobile management node MME in step S2016, and S1/X2 interfaces are established between the relay node RN and the mobile management node MME in step S2017.

In step S2018, the radio base station DeNB transmits the setting information of the Un subframe, the transmission timing of the R-PDCCH and the R-PDSCH in the Un subframe, the number of OFDM symbols receivable in one Un subframe, the arrangement pattern of the DM-RS addressed to the relay node RN in the Un subframe, and the like to the relay node RN through "RRC Un Subframe Configuration", which is a new RRC message, or the "RRC Connection Reconfiguration".

In step S2019, the relay node RN transmits "RRC Un Subframe Configuration Complete", which is a new RRC message, or the "RRC Connection Reconfiguration Complete" to the radio base station DeNB.

In step S2020, the relay node RN starts a reception process of a downlink signal on the Un subframe.

The above-mentioned characteristics of this embodiment may be expressed as follows.

A first characteristic of the present embodiment is summarized in that a mobile communication method includes: a step of transmitting, by a radio base station DeNB, a first downlink signal in a first subframe to a relay node RN; a step of transmitting, by the relay node RN, a second downlink signal in a second subframe to a mobile station UE; a step of notifying, by the relay node RN, the radio base station DeNB of information indicating "Half duplex inband Relay Node" (it prevents the first subframe and the second subframe from overlapping each other in a time direction); and a step of transmitting, by the radio base station DeNB, a transmission timing of R-PDCCH (a physical downlink control channel addressed to the relay node RN) and R-PDSCH (a physical downlink shared channel addressed to the relay node RN) in a Un subframe (a subframe between the radio base station DeNB and the relay node RN) to the relay node RN according to the notification.

In the first characteristic of the present embodiment, the R-PDCCH may include a channel for transmitting HARQ-ACK in an uplink.

A second characteristic of the present embodiment is summarized in that a mobile communication method includes: a step of transmitting, by a radio base station DeNB, a first downlink signal in a first subframe to a relay node RN; a step of transmitting, by the relay node RN, a second downlink signal in a second subframe to a mobile station UE; a step of notifying, by the relay node RN, the radio base station DeNB of information indicating "Half duplex inband Relay Node"; and a step of transmitting, by the radio base station DeNB, the number of OFDM symbols receivable in one Un subframe to the relay node RN according to the notification.

A third characteristic of the present embodiment is summarized in that a mobile communication method includes: a step of transmitting, by a radio base station DeNB, a first downlink signal in a first subframe to a relay node RN; a step of transmitting, by the relay node RN, a second downlink signal in a second subframe to a mobile station UE; a step of notifying, by the relay node RN, the radio base station DeNB of information indicating "Half duplex inband Relay Node"; and a step of transmitting, by the radio base station DeNB, an arrangement pattern of DM-RS (a reference signal for demodulation) addressed to the relay node RN in a Un subframe to the relay node RN according to the notification.

A fourth characteristic of the present embodiment is summarized in that a radio base station DeNB, which is used in a mobile communication system in which a relay node RN is configured to transmit a second downlink signal in a second subframe to a mobile station UE, includes: a transmission unit 13 which is configured to transmit a first downlink signal in a first subframe to the relay node RN, wherein, when a notification indicating "Half duplex inband Relay Node" is received from the relay node RN, the transmission unit 13 is configured to transmit a transmission timing of R-PDCCH and R-PDSCH in a Un subframe to the relay node RN.

In the fourth characteristic of the present embodiment, the R-PDCCH may include a channel for transmitting HARQ-ACK in an uplink.

A fifth characteristic of the present embodiment is summarized in that a radio base station DeNB, which is used in a mobile communication system in which a relay node RN is configured to transmit a second downlink signal in a second subframe to a mobile station UE, includes: a transmission unit 13 which is configured to transmit a first downlink signal in a first subframe to the relay node RN, wherein, when a notification indicating "Half duplex inband Relay Node" is received from the relay node RN, the transmission unit 13 is configured to transmit the number of OFDM symbols receivable in one Un subframe to the relay node RN.

A sixth characteristic of the present embodiment is summarized in that a radio base station DeNB, which is used in a mobile communication system in which a relay node RN is configured to transmit a second downlink signal in a second subframe to a mobile station UE, includes: a transmission unit 13 which is configured to transmit a first downlink signal in a first subframe to the relay node RN, wherein, when a notification indicating "Half duplex inband Relay Node" is received from the relay node RN, the transmission unit 13 is configured to transmit an arrangement pattern of DM-RS addressed to the relay node RN in a Un subframe to the relay node RN.

Note that the operation of the mobile management node MME, the radio base station DeNB, the relay node RN, or the mobile station UE may be performed by hardware, a software module performed by a processor, or a combination thereof.

The software module may be arranged in a storage medium of an arbitrary format such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can write and read information into and from the storage medium. Such a storage medium may also be accumulated in the processor. Such a storage medium and processor may be arranged in an ASIC. The ASIC may be arranged in the mobile management node MME, the radio base station DeNB, the relay node RN, or the mobile station UE. Furthermore, such a storage medium and processor may be arranged in the mobile management node MME, the radio base station DeNB, the relay node RN, or the mobile station UE as discrete components.

Thus, the present invention has been explained in detail by using the above-described embodiments; however, it is obvious that for persons skilled in the art, the present invention is not limited to the embodiments explained herein. The present invention can be implemented as a corrected and modified mode without departing the gist and the scope of the present invention defined by the claims. Therefore, the description of the specification is intended for explaining the example only and does not impose any limited meaning to the present invention.

REFERENCE SIGNS LIST

MME . . . Mobile management node
UE . . . Mobile station
DeNB . . . Radio base station
RN . . . Relay node
11, 21 . . . Reception unit
12, 22 . . . Control unit
13, 23 . . . Transmission unit

The invention claimed is:

1. A mobile communication method comprising:
a step of transmitting, by a radio base station, a first downlink signal in a first subframe to a relay node;
a step of transmitting, by the relay node, a second downlink signal in a second subframe to a mobile station;
a step of providing, by the relay node, during a relay node attach procedure, information indicating the relay node is a half duplex inband relay node; and a step of transmitting, by the radio base station, after the relay node attach procedure is completed and after the relay node sets up S1/X2 interfaces, a transmission timing of a physical downlink control channel and a physical downlink shared channel addressed to the relay node in a subframe between the relay node and the radio base station to the relay node according to the information.

2. The mobile communication method according to claim 1, wherein the physical downlink control channel includes a channel for transmitting HARQ-ACK in an uplink.

3. A mobile communication method comprising:
a step of transmitting, by a radio base station, a first downlink signal in a first subframe to a relay node;
a step of transmitting, by the relay node, a second downlink signal in a second subframe to a mobile station;
a step of providing, by the relay node, during a relay node attach procedure, information indicating the relay node is a half duplex inband relay node; and
a step of transmitting, by the radio base station, after the relay node attach procedure is completed and after the relay node sets up S1/X2 interfaces, an arrangement pattern of a reference signal for demodulation addressed to the relay node in a subframe between the relay node and the radio base station to the relay node according to the information.

4. A radio base station, which is used in a mobile communication system in which a relay node is configured to transmit a second downlink signal in a second subframe to a mobile station, comprising:
a transmitter configured to transmit a first downlink signal in a first subframe to the relay node; and
a receiver configured to receive a notification indicating the relay node is a half duplex inband relay node, wherein
when the notification indicating the relay node is a half duplex inband relay node is received from the relay node during a relay node attach procedure, the transmitter is configured to transmit, after the relay node attach procedure is completed and after the relay node sets up S1/X2 interfaces, a transmission timing of a physical downlink control channel and a physical downlink shared channel addressed to the relay node in a subframe between the relay node and the radio base station to the relay node.

5. The radio base station according to claim 4, wherein the physical downlink control channel includes a channel for transmitting HARQ-ACK in an uplink.

6. A radio base station, which is used in a mobile communication system in which a relay node is configured to transmit a second downlink signal in a second subframe to a mobile station, comprising:
a transmitter configured to transmit a first downlink signal in a first subframe to the relay node; and
a receiver configured to receive a notification indicating the relay node is a half duplex inband relay node, wherein
when the notification indicating the relay node is a half duplex inband relay node is received from the relay node during a relay node attach procedure, the transmitter is configured to transmit, after the relay node attach procedure is completed and after the relay node sets up S1/X2 interfaces, an arrangement pattern of a reference signal for demodulation addressed to the relay node.

* * * * *